(12) United States Patent
Tsirkin et al.

(10) Patent No.: US 10,140,218 B2
(45) Date of Patent: Nov. 27, 2018

(54) NON-UNIFORM MEMORY ACCESS SUPPORT IN A VIRTUAL ENVIRONMENT

(71) Applicant: Red Hat Israel, Ltd., Ra'anana (IL)

(72) Inventors: Michael Tsirkin, Westford, MA (US); Marcel Apfelbaum, Afula (IL)

(73) Assignee: RED HAT ISRAEL, LTD., Ra'anana (IL)

( * ) Notice: Subject to any disclaimer, the term of this patent is extended or adjusted under 35 U.S.C. 154(b) by 0 days.

(21) Appl. No.: 15/583,154

(22) Filed: May 1, 2017

(65) Prior Publication Data
US 2017/0235679 A1  Aug. 17, 2017

Related U.S. Application Data

(63) Continuation-in-part of application No. 14/597,802, filed on Jan. 15, 2015, now Pat. No. 9,639,492.

(51) Int. Cl.
*G06F 9/455* (2018.01)
*G06F 13/40* (2006.01)
(Continued)

(52) U.S. Cl.
CPC ........ *G06F 12/1036* (2013.01); *G06F 9/4405* (2013.01); *G06F 9/45558* (2013.01); *G06F 13/4045* (2013.01); *G06F 13/4068* (2013.01); *G06F 13/4221* (2013.01); *G06F 13/4282* (2013.01); *G06F 13/24* (2013.01); *G06F 2009/45579* (2013.01); *G06F 2009/45583* (2013.01); *G06F 2009/45595* (2013.01); *G06F 2212/2542* (2013.01); *G06F 2213/0026* (2013.01)

(58) Field of Classification Search
CPC ............... G06F 12/1036; G06F 9/4405; G06F 9/45558; G06F 2009/45579; G06F 2212/2542; G06F 2213/0026; G06F 13/4045

See application file for complete search history.

(56) References Cited

U.S. PATENT DOCUMENTS 7,613,847 B2   11/2009   Kjos et al.
8,316,377 B2   11/2012   Riley
(Continued)

OTHER PUBLICATIONS

Wong, Heymian, "PCI Express Multi-Root Switch Reconfiguration During System Operation", Copyright © 2011 Massachusetts Institute of Technology, 67 pgs.
(Continued)

*Primary Examiner* — Glenn A. Auve
(74) *Attorney, Agent, or Firm* — Haynes and Boone, LLP (57) ABSTRACT

Methods, systems, and computer program products for configuring devices in a virtual environment are described. An example method includes determining a NUMA node assigned to a virtual machine. A guest of the virtual machine probes a root bus to detect a first device coupled to the root bus. The first device is assigned, based on the determined NUMA node, a first address range of the virtual machine. The guest is notified of an expander coupled to the first virtual root bus. The expander is probed to detect an additional root bus. The guest probes the additional root bus to detect a second device. The second device is assigned, based on the determined NUMA node, a second address range.

20 Claims, 8 Drawing Sheets

(51) Int. Cl.
*G06F 13/42* (2006.01)
*G06F 12/1036* (2016.01)
*G06F 9/4401* (2018.01)
*G06F 13/24* (2006.01)

(56) References Cited

U.S. PATENT DOCUMENTS

| | | |
|---|---|---|
| 8,386,654 B2 | 2/2013 | Brinkmann et al. |
| 8,521,915 B2 | 8/2013 | Kishore et al. |
| 8,521,941 B2 | 8/2013 | Regula |
| 8,725,926 B2 | 5/2014 | Baba et al. |
| 8,838,867 B2 | 9/2014 | Daniel |
| 9,268,717 B2 | 2/2016 | Kanigicherla et al. |
| 9,639,492 B2 * | 5/2017 | Tsirkin ................ G06F 13/4045 |
| 2010/0251234 A1 * | 9/2010 | Oshins .................. G06F 9/4856 718/1 |
| 2011/0060859 A1 | 3/2011 | Shukla et al. |
| 2014/0201419 A1 | 7/2014 | Ayzenfeld et al. |
| 2015/0032910 A1 | 1/2015 | Yehuda et al. |
| 2015/0052287 A1 * | 2/2015 | Venkatasubramanian ................... G06F 9/5033 711/6 |
| 2016/0321207 A1 * | 11/2016 | Apfelbaum ......... G06F 13/4022 |
| 2017/0256323 A1 * | 9/2017 | Taniuchi ............... G06F 9/4406 |
| 2017/0364279 A1 * | 12/2017 | Banerjee ............... G06F 3/0611 |
| 2018/0039594 A1 * | 2/2018 | Apfelbaum ......... G06F 13/4081 |

OTHER PUBLICATIONS

Levasseur, Joshua, et al., "A Sledgehammer Approach to Reuse of Legacy Device Drivers", System Architecture Group, University of Karlshure, Germany, Published in the Proceedings of the 11$^{th}$ ACM European SIGOPS Workshop, Leuven, Belgium, Sep. 19-22, 2004, 6 pgs.

Wagh, Mahesh, "IOV Overview and Update", PCI Technology Seminar, Copyright © 2008, PCI-SIG, 37 pgs.

* cited by examiner

FIG. 8

NON-UNIFORM MEMORY ACCESS SUPPORT IN A VIRTUAL ENVIRONMENT

PRIORITY

This is a continuation-in-part application of U.S. patent application Ser. No. 14/597,802, titled "Virtual PCI Expander Device," filed on Jan. 15, 2015, which is herein incorporated by reference in its entirety.

BACKGROUND

A virtual machine is software that is executed on hardware to create a virtualization of a physical computer system. Virtual machines may function as self-contained platforms that run their own operating systems and software applications.

A host machine, such as a server computer may concurrently run one or more virtual machines using software that is referred to as a hypervisor. The hypervisor allocates a certain amount of the host's resources, such as the host's underlying physical processors and memory devices, to each of the virtual machines, allowing the virtual machines to transparently access the host's resources.

Each virtual machine may use the allocated resources to execute applications, including operating systems referred to as guest operating systems. Each virtual machine guest operating system may be accessed by one or more local or remote clients to perform computing tasks.

BRIEF SUMMARY

A system of one or more computers can perform particular operations or actions by virtue of having software, firmware, hardware, or a combination thereof installed on the system that in operation causes or cause the system to perform the actions. One or more computer programs can perform particular operations or actions by virtue of including instructions that, when executed by data processing apparatus, cause the apparatus to perform the actions. One general aspect includes a method for configuring devices in a virtual environment including: probing a root bus to detect a first device coupled to the root bus. The method also includes assigning the first device to a first virtual root bus of a virtual machine. The method also includes assigning a first address range corresponding to the first device, where the first address range is assigned based on determining a NUMA node corresponding to the virtual machine; providing a notification, to a guest of the virtual machine, of an expander coupled to the first virtual root bus; probing, by the guest, the expander to detect a second device coupled to an additional root bus. The method also includes assigning the second device to a second virtual root bus of the virtual machine. Other examples of this aspect include corresponding computer systems, apparatus, and computer programs recorded on one or more computer storage devices, each to perform the actions of the methods.

One general aspect includes a non-transitory computer-readable medium including computer-readable instructions which, when executed by a processor, cause the processor to perform operations including: probing a root bus to detect a first device coupled to the root bus. The non-transitory computer-readable medium also includes instructions for assigning the first device to a first virtual root bus of a virtual machine. The non-transitory computer readable medium also includes instructions for assigning a first address range corresponding to the first device, where the first address range is assigned based on determining a NUMA node corresponding to the virtual machine; providing a notification, to a guest of the virtual machine, of an expander coupled to the first virtual root bus; probing, by the guest, the expander to detect a second device coupled to an additional root bus. The non-transitory computer-readable medium also includes instructions for assigning the second device to a second virtual root bus of the virtual machine. Other examples of this aspect include corresponding computer systems, apparatus, and computer programs recorded on one or more computer storage devices, each to perform the actions of the methods.

One general aspect includes a system for configuring devices in a virtual environment, including: a host machine including a root bus that is communicatively coupled to a first physical device and a second physical device, where the first physical device and the second physical device are assigned to an address space of a host NUMA node. The system also includes a hypervisor running on the host machine, the hypervisor to notify a guest of a virtual machine of the presence of the first physical device and the second physical device. The system also includes the guest, which assigns a first virtual device to a first virtual root bus, the first virtual device corresponding to the first physical device, where the first virtual device is assigned a first address range of a virtual NUMA node that corresponds to the host NUMA node. The guest further assigns a second virtual device to a second virtual root bus, the second virtual device corresponding to the second physical device. Other examples of this aspect include corresponding computer systems, apparatus, and computer programs recorded on one or more computer storage devices, each to perform the actions of the methods.

DETAILED DESCRIPTION

In the following description, specific details are set forth describing some examples consistent with the present disclosure. It will be apparent, however, to one skilled in the art that some examples may be practiced without some or all of these specific details. The specific examples disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one example may be incorporated into other examples unless specifically described otherwise or if the one or more features would make an example non-functional.

Non-Uniform Memory Access (NUMA) is a technology that assigns memory and. devices (such as processors) to groups that are referred to as NUMA nodes. NUMA technology generally results in improved access of the devices to the memory as resource contention is reduced, thus providing increased device performance. Conventional virtualization technology is error-prone with respect to NUMA and generally is unable to reliably assign NUMA nodes to virtual devices. Accordingly, a need exists for reliably providing the advantages of NUMA technology to a virtual environment.

Various examples include systems, methods, and software for configuring devices in a virtual environment. As described herein, host devices are assigned to NUMA nodes of a host machine. As further described herein, in a virtual environment, the virtual devices corresponding to the host devices are assigned to virtual NUMA nodes that correspond to the host machine's NUMA nodes. Techniques for performing the assignments include configuring, by a hypervisor, a configuration address space of a virtual machine with information that notifies a guest of a virtual machine regarding address ranges that are assigned to the host machine's NUMA nodes. The guest probes the configuration address space to access the NUMA node information and configures virtual devices to be assigned to address ranges corresponding to the NUMA nodes that are described in the configuration address space. As a result, the performance advantages of NUMA that are provided to physical devices of a host machine are also provided to virtual devices of virtual machines running on the host machine. That is, the virtual devices are provided with improved access to memory as resource contention is reduced, thereby providing increased virtual device performance.

Figure 1:
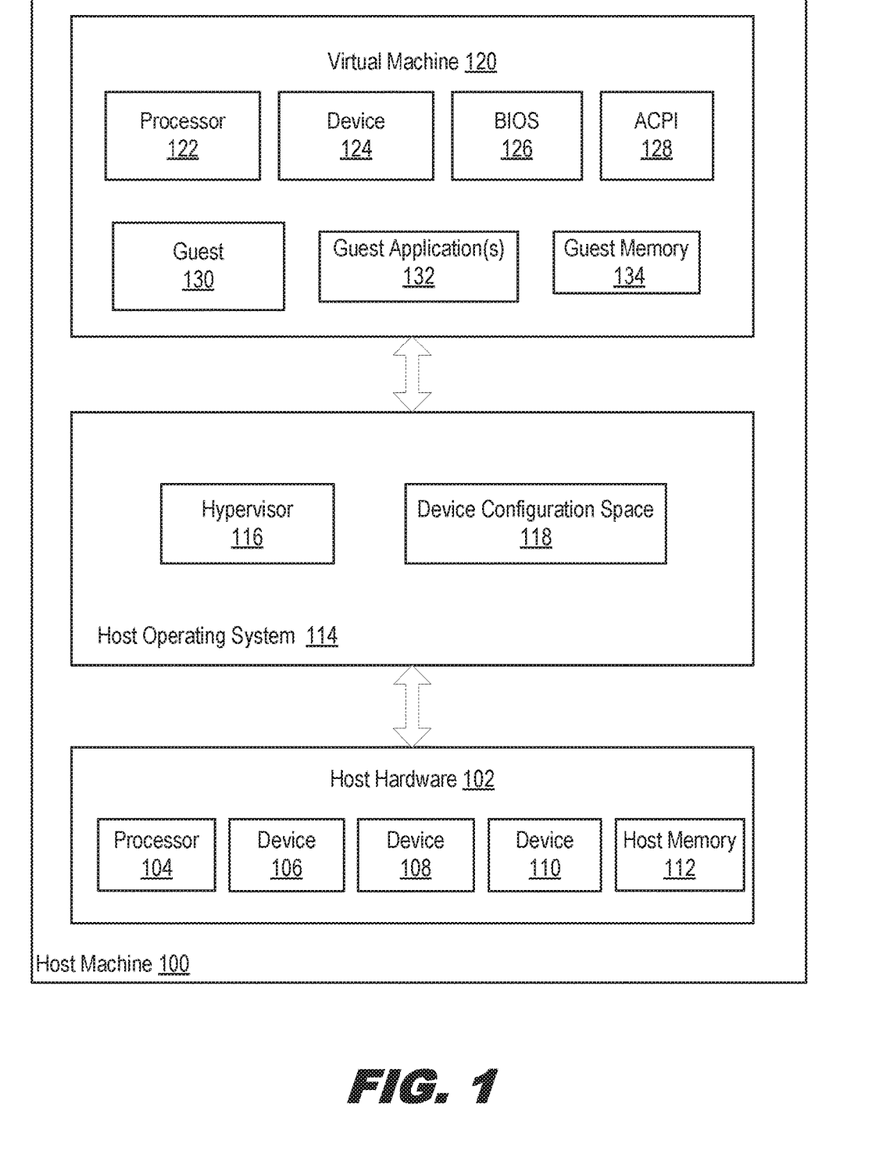
FIG. 1 is a block diagram illustrating an example of a computer system hosting a virtual machine, in accordance with various examples of the present disclosure.

FIG. 1 is a block diagram that illustrates an example of physical computer system that hosts one or more virtual machines. The physical computer system is referred to herein as a host machine 100.

Host machine 100 includes host hardware 102, which includes a processor 104, devices 106, 108 and 110, host memory 112, and other hardware components. Host machine 100 may include a single machine or multiple host machines arranged in a cluster.

The term "processor" may refer to one processor or multiple processors arranged in a cluster. Each processor may be a processor core of a microprocessor, a central processing unit (CPU), and so forth. Some processors may be different processing cores of a processing device that consists of a single integrated circuit. Some processors may be components of a multi-chip module (e.g., in which separate microprocessor dies are included in a single package). Additionally, processors may have distinct dies and packaging, and be connected via circuitry such as discrete circuitry and/or a circuit board.

Each of the devices 106, 108 and 110 may be a physical device that is internal or external to host machine 100. Some examples of internal devices include a graphics card, hardware RAID controller, network controller, secondary storage (e.g., hard disk drive, magnetic or optical storage based disks, tapes or hard drives), universal serial bus (USB) devices, internal input/output (I/O) devices, and so forth. Some examples of external devices include a keyboard, mouse, speaker, external hard drive, external I/O devices, and so forth. Devices 106, 108 and 110 communicate with software executed in the host memory 112. For example, the devices send data by generating device interrupts. Data is sent to the devices by writing data to ranges of addresses in the host memory 112 that are assigned to the devices.

Host memory 112 may include volatile memory devices (e.g., random access memory (RAM)), non-volatile memory devices (e.g., flash memory), and/or other types of memory devices.

Host machine 100 includes a host operating system 114 that is used to install and execute software programs. Host machine 100 includes a hypervisor 116 (also known as a virtual machine monitor (VMM)). In the present example, hypervisor 116 is a component of a host operating system 114. In other examples, hypervisor 116 may run on top of a host operating system 114, or may run directly on host hardware 102 without the use of a host operating system 114. Some examples of hypervisors that may be used include QEMU and KVM.

The host machine 100 architecture supports NUMA so that some memory regions of the host memory 112 are connected directly to one of more of the processors 104. By connecting memory regions directly to processors 104, the host machine 100 reduces contention for memory resources and improves host machine 100 performance.

Hypervisor 116 manages system resources, including access to processor 104, devices 106, 108, 110, host memory 112, and so forth. Hypervisor 116, though usually implemented in software, may emulate and export a bare machine interface (host hardware 102) to higher-level software. Such higher-level software may comprise a standard or real-time operating system that may be a highly stripped down operating environment with limited operating system functionality and may not include traditional operating system facilities.

Host operating system 114 includes a device configuration space 118, such as a PCI configuration space, that specifies the memory and input/output (I/O) address ranges assigned to host hardware 102 devices (e.g., device 106, 108 and 110). In some examples, device configuration space 118 includes one or more registers, tables, lists or other data structures that associate memory and I/O address ranges with corresponding devices that are coupled to the main host bus of host machine 100. The main host bus may include, for example, one or more root buses (e.g., root bus 0, a primary bus).

The host machine's use of NUMA impacts memory allocation and virtualization. To take advantage of the performance optimizations provided by NUMA, it is useful for the hypervisor 116 to directly configure devices, e.g. device 106, to connect to the NUMA node that has been configured for the virtual machine 120. The examples disclosed herein support this configuration, as described in more detail with respect to FIG. 3. The disclosed approaches can take the NUMA architecture, node configuration, and virtual machine NUMA node affinity into account in the processes described herein. For example, the hypervisor 116 may configure a host-bridge to attach to a same NUMA node that is assigned a virtual machine a virtual NUMA node. Accordingly, when a PCI device (or other device) configured for that virtual machine tries to access memory via direct memory access (DMA), the memory access speed is improved. Using the techniques described herein, each host-bridge and all of the devices behind it can be attached to a NUMA node. In some examples, the hypervisor 116 configures a virtual machine's physical memory to be provided by different NUMA nodes. Accordingly, the hypervisor can assign virtual NUMA nodes to the virtual machine by mapping the virtual NUMA nodes to respective host NUMA nodes.

In the present example, up to thirty-two devices may be coupled to each root bus. One or more expanders may be coupled to nodes of the root bus. An expander may be a device such as a PCI Expander Bridge (PXB) device. An expander provides what is referred to as a secondary bus. In the present example, an expander may provide nodes for additional devices to be coupled to the expander. These additional devices are referred to as "downstream of" or "behind" the expander. The devices coupled to the root bus are referred to as "upstream" from the expander. From the point of view of the host, the main host bus comprises a tree structure that includes root bus branches with nodes, wherein each of the nodes may be further branched into additional nodes using an expander. Further branches may be provided downstream by using additional expanders. From the view of the guest, devices coupled to expanders may be viewed as being coupled to additional primary buses. For example, a host may view a first device as coupled to a first primary root bus, and a second device as coupled to an expander that is coupled to the first primary root bus. In the present invention, the guest running on a virtual machine may view the first device as coupled to a first primary virtual root bus, and the second device as coupled to a second primary virtual root bus. The mapping of the second device to a second primary virtual root bus, on the virtual machine, offers advantages such as allowing booting from the second device.

In the present example, the information regarding the mappings of devices to buses is maintained in the device configuration space 118. Hypervisor 116 accesses the device configuration space 118 to build a configuration address space for virtual machines (e.g., virtual machine 120), such that virtual machines are notified of device configuration information.

Hypervisor 116 presents an abstraction of one or more virtual machines. In the present example, the hypervisor provides a virtual machine 120, which is an underlying emulation of host machine 100. Virtual machine 120 can be, for example, a hardware emulation, full virtualization, para-virtualization, and operating system-level virtualization virtual machine.

The term virtual machine generally refers to part of a host system that is visible to the guest. A virtual machine may include, for example, virtual CPUs (e.g., processor 122), one or more virtual devices (e.g., device 124) such as an emulated NIC or disk, physical devices over which a guest is given partial or full control, virtual firmware such as a Basic Input/Output System (BIOS) (e.g., BIOS 126) and/or an Extensible Firmware Interface (EFI), an Advanced Configuration and Power Interface (ACPI) (e.g., ACPI 128), virtual memory (e.g., guest memory 134), and so forth.

In the present example, a guest 130 manages resources of the virtual machine 120. The term "guest" refers to the computer readable instructions run on a hypervisor 116 that is installed on a disk, loaded into memory, or currently running. A guest 130 may include, for example, a copy of firmware in memory, an operating system, additional installed software, a browser, applications running in a browser, and so forth. In one example, a virtual machine 120 running on a host machine 100 may run the same or a different guest operating system as the host operating system 114. Some examples of types of operating systems that may be run include LINUX, UNIX, OS X, WINDOWS, and so forth. Operating systems include legacy operating systems that do not support PCI EXPRESS (Peripheral Component Interconnect Express). In the present invention, the operating systems may be booted by a virtual machine 120 from devices coupled to one or more primary buses of the virtual machine 120. In the present invention, by using expander devices, additional primary buses may be created as needed for the virtual machine 120.

One or more guest application(s) 132 run on guest 130. In an example, a guest application 132 may be a process or other type of software application that are executed. In one example, a guest application 132 also may refer to a process or application that runs on the guest operating system.

Guest memory 134 is memory allocated to and available for use by a guest 130. Guest memory 134 may store, for example, a configuration address space for virtual machine 120. In an example, guest memory 134 may be memory presented to guest 130 by hypervisor 116. In one example, guest memory 134 is mapped to corresponding memory from a host machine 100 (e.g., host memory 112). For example, a unit of guest memory 134 may be mapped to and provided using a corresponding unit of host memory 112. A unit of memory generally refers to any subset, portion, piece, range, or region of memory (e.g., guest memory 134, host memory 112). Such "areas of memory" or "memory areas" may be referred to, as pages, blocks, extents, or any other type of measurable unit(s).

Figure 2:
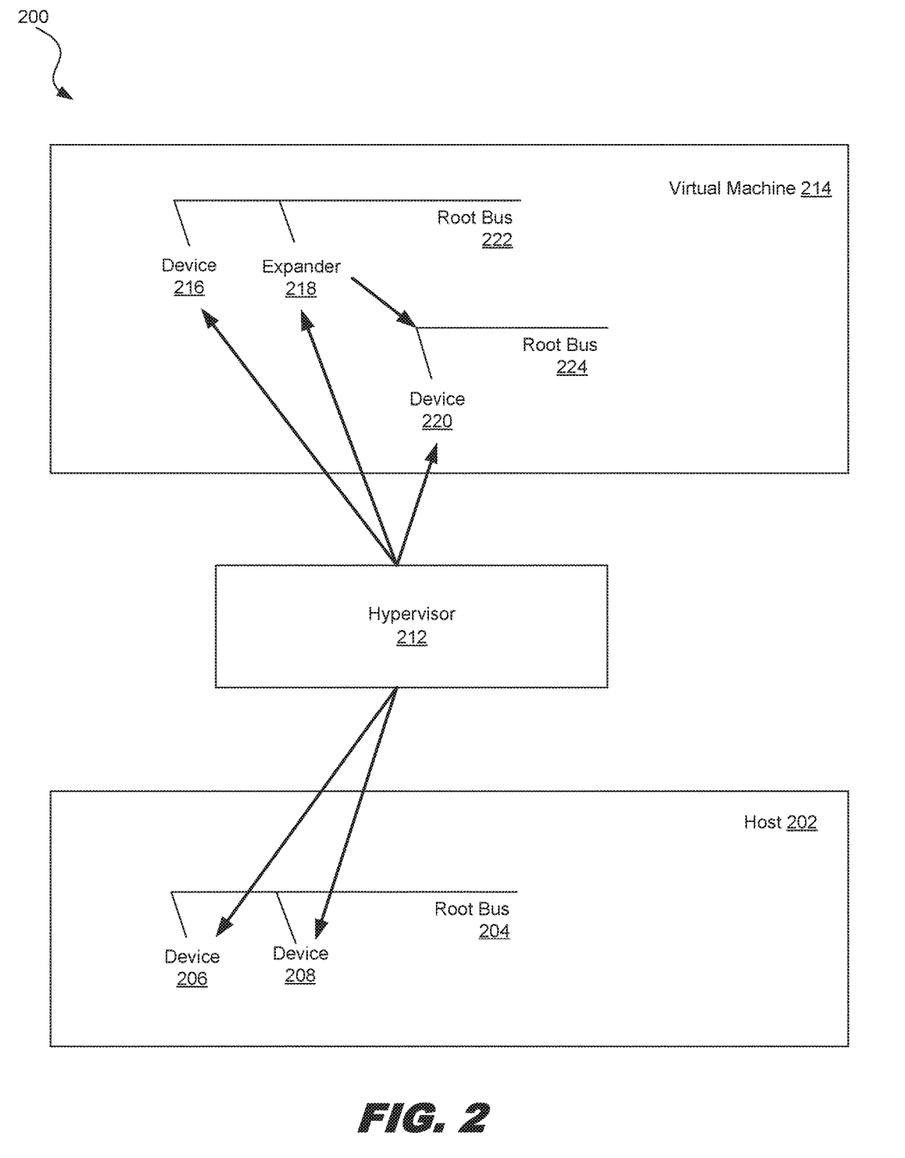
FIG. 2 is a block diagram illustrating a mapping between virtual machine devices and host devices, in accordance with various examples of the present disclosure.

FIG. 2 is a block diagram illustrating a mapping between virtual machine devices and host devices.

According to the present example, a system 200 includes a host 202 that includes a plurality of physical devices that are assigned to a root bus 204. In the present example, devices 206 and 208 are assigned to root bus 204 of the host 202. There may be additional devices also assigned to root bus 204 that are not shown.

The host 202 maintains a configuration address space that identifies assignments of the memory and I/O ranges corresponding to the plurality of devices (e.g., devices 206 and 208) coupled to root bus 204 such that the host 202 is able to send data to the devices that are coupled to the buses and receive interrupts from the devices.

In the present example, the hypervisor 212 is configured with access to the host 202 configuration address space. The hypervisor 212 accesses the host 202 configuration address space in order to configure virtual machine devices corresponding to the host 202 devices. In the present example, the hypervisor 212 configures a virtual machine 214 configuration address space with configuration data corresponding to device 216, expander 218 and device 220. Accordingly, device 216 is mapped to device 206 and device 220 is mapped to device 208. In the present example, expander 218 is a PCI expander bridge (PXB) device that allows the virtual machine 214 to be configured with additional devices beyond a device number limit that a single root bus could provide.

In some examples, the virtual machine 214 may be configured with more devices than there is availability for on a single root bus. For example, a single root bus may allow thirty-two devices to be coupled to the single root bus. The virtual machine 214 may be configured with more than thirty-two devices. Accordingly, expander 218 is configured by hypervisor 212 to support additional devices. These additional devices may be mapped, using the expander 218, to a second root bus, root bus 224. Device 220 is assigned, using a mapping provided by expander 218, to root bus 224. The root buses of the virtual machine 214 may be referred to as virtual root buses (e.g., root bus 222 may be referred to as a first virtual root bus and root bus 224 may be referred to as a second virtual root bus).

Accordingly, device 216 on root bus 222 is mapped to device 206 on root bus 204. Device 220 on root bus 224 is mapped to device 208 on root bus 204.

The virtual machine 214 firmware assigns memory and I/O address ranges to each of the devices on root bus 222 and root bus 224. A guest running on the virtual machine 214 is able to use the memory and I/O assignments to communicate with the virtual devices, which are mapped to the host devices as shown.

In some examples, the devices 216 and 220 may include storage devices. Mapping the devices to primary buses (e.g. root bus 222 and root bus 224) offers the advantage of the ability to boot from the devices. In some examples, legacy operating systems may be unable to boot unless the operating systems are stored on devices coupled to a primary bus. In these examples, an operating system may be booted by the virtual machine from device 216 and/or device 220 because the devices appear to the operating system as primary bus devices.

Figure 3:
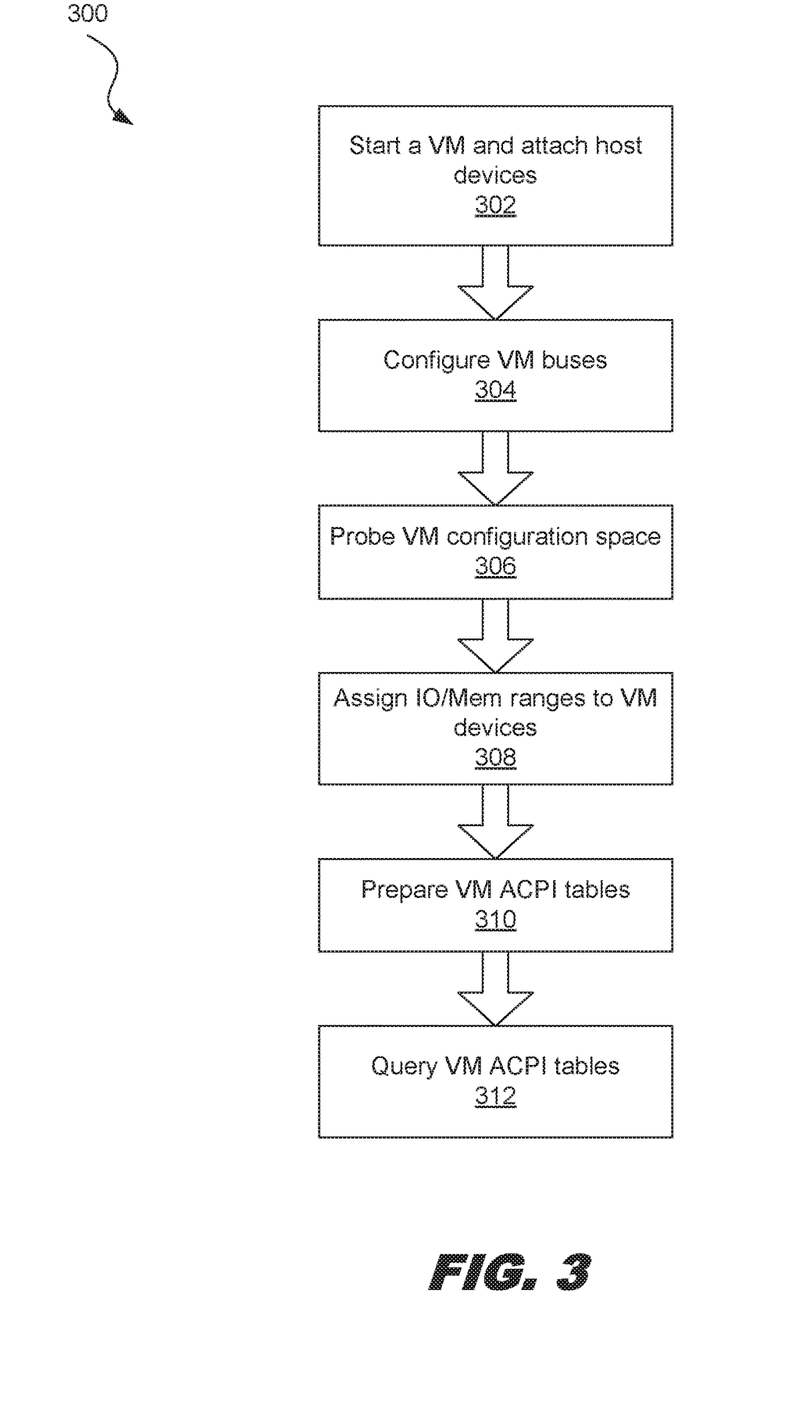
FIG. 3 is a flowchart showing an illustrative configuration of virtual machine devices, in accordance with various examples of the present disclosure.

FIG. 3 is a flowchart showing an illustrative configuration of virtual machine devices. The method 300 may be performed by processing logic that may comprise hardware (e.g., circuitry, dedicated logic, programmable logic and microcode), software (such as instructions run on a computer system, specialized hardware, dedicated machine, or processing device), firmware, or a combination thereof.

At block 302, a hypervisor starts a virtual machine. At this point in time, a guest operating system of the virtual machine is not yet started. The hypervisor accesses configuration address space of the host, in order to identify the host devices and attach the host devices to the virtual machine. In the present example, attaching of host devices to the virtual machine is performed by preparing the configuration address space of the virtual machine based on devices identified in the host configuration address space.

At block 304, the hypervisor configures the virtual machine's hardware by configuring a primary bus in the configuration address space of the virtual machine. In the present example the primary bus is referred to as root bus 0. The hypervisor configures a first virtual device, which is behind the virtual machine's root bus 0. In the present example, the first virtual device corresponds to a first host device. The hypervisor also configures an expander behind the virtual machine's root bus 0. The expander is associated with a number that identifies a bus number of another root bus (e.g., a second root bus). Moreover, the hypervisor assigns the virtual machine to one or more virtual NUMA nodes that the hypervisor maps to the host NUMA nodes.

The hypervisor configures another primary bus in the address space of the virtual machine. In the present example the primary bus is referred to as root bus 1. The hypervisor configures a second virtual device, which is behind the virtual machine's root bus 1.

At block 306, the firmware of the virtual machine scans the virtual machine hardware by probing the configuration address space of the virtual machine. In the present example, the firmware of the virtual machine is a BIOS. In other examples, the virtual machine firmware is another type of firmware (e.g., UEFI, EFI, and so forth). The virtual machine firmware may obtain information regarding host bridges by probing each bus number between 0 and 255 to identify devices behind the bus number.

In other examples, other techniques may be used to determine information regarding host bridges. For example, the virtual machine firmware may receive information regarding host bridges from the hypervisor using a para-virtualized channel between the hypervisor and the firmware.

In the present example, devices in the configuration address space of the virtual machine may be identified by a root bus number, slot number, and device number. For example, 00:00.0 identifies root bus 0, slot 0 and device 0. A probe of the configuration space may scan a first root bus by probing between 00:00.0 and 00:FF:F. Accordingly, the BIOS of the virtual machine scans all of the devices on root bus 0. Each root bus starts a new PCI hierarchy.

The BIOS identifies devices on bus 0 that are expanders (e.g., PCI Expander Bridge devices). Once the expander is identified on root bus 0, the BIOS is notified that there is a second root bus. The expander is configured in the virtual machine's configuration address space with a number corresponding to a root bus number. In the present example, the number associated with the expander is 1. The identifying of the information from the expander may be referred to as probing the expander. The BIOS uses the number determined from the expander to scan the root bus associated with the number. Since the number in this example is 1, the BIOS is alerted that there are additional devices on root bus 1. Accordingly, the BIOS scans the devices of root bus 1 by probing the configuration address space of the virtual machine between 01:00.0 and 01:FF.F.

In some examples, additional expanders, if present, may expose additional root buses. For example, there may be additional root buses exposed beyond a first root bus and a second root bus. Additional exposed root buses may be similarly scanned based on additional expanders identified during the probing of the root buses.

At block 308, the BIOS assigns I/O and address ranges to the located devices, as needed, based on the probing of the virtual machine's configuration address space. In the present example, the I/O and address ranges are assigned in the virtual machine's configuration address space. The assignment in block 308 can take into account the identified NUMA architecture and current nodes of the virtual machine. An example may be illuminating: say the host has eight NUMA nodes and the virtual machine receives two gigabytes of RAM, one gigabyte of RAM from node 4 and one gigabyte of RAM from node 6. The virtual machine could have two virtual NUMA nodes, 1 and 2, the first NUMA node mapped to host node 4 and second NUMA node mapped to host node 6. The mapping of the virtual NUMA nodes to the host NUMA nodes allows the virtual machine to operate more efficiently by accessing the host NUMA nodes in a more direct manner. Turning to the assignment in block 308, when a physical device is attached to the VM—say the device is from the host NUMA node 6, the hypervisor assigns this device to virtual NUMA node 2 in the virtual machine. Accordingly, the address range assigned to the first device corresponds to an address range of virtual NUMA node 2, which is mapped to host NUMA node 6. Adding an expander host bridge and attaching it to virtual NUMA node 2 facilitates this and the device is placed behind this expander to ensure that the guest OS on the virtual machine can use the device more efficiently.

In the present example, the configuration address space, such as ACPI tables, of the virtual machine includes an identification of the one or more virtual NUMA nodes that are assigned to a virtual machine by the hypervisor. A guest of the virtual machine, such as the operating system, may query the ACPI tables to determine connections of components (e.g., CPU, RAM, host bridge, and so forth) to virtual NUMA nodes. The virtual NUMA nodes correspond to one or more host NUMA nodes of the host machine. Accordingly, address space of the NUMA nodes may be assigned to devices to increase device performance.

At block 310, the hypervisor queries the virtual machine's configuration address space to retrieve the memory and I/O addresses that were assigned by the virtual machine's BIOS. The hypervisor prepares ACPI tables that may be accessed by the virtual machine's operating system.

In particular, information such as the bus number ranges and I/O address ranges corresponding to the devices are stored in one or more ACPI tables. In the present example, the information is stored in a particular ACPI table that is referred to as a Secondary System Description Table (SSDT). Devices located by scanning the first root bus are mapped to a first root bus of the virtual machine, in the SSDT. The first root bus of the virtual machine may be referred to as a first virtual root bus. Devices located by scanning the second root bus are mapped to a second root bus of the virtual machine in the SSDT. The second root bus of the virtual machine may be referred to as a second virtual root bus. Additional devices may be assigned to additional root buses, as necessary (e.g., additional expanders may identify a third root bus, a fourth root bus, and so forth).

At block 312, a guest operating system is started on the virtual machine. The guest operating system queries the ACPI tables to discover the information contained in the SSDT table. The ACPI tables expose the bus and device information to the guest operating system. The guest operating system determines the number and identify of the root buses, and how the virtual machine's resources are assigned to the root buses. An image may be built that contains the discovered information, such that the guest operating system may quickly access the information as needed. The guest operating system may then finish the boot up (or reboot) process.

Figure 4:
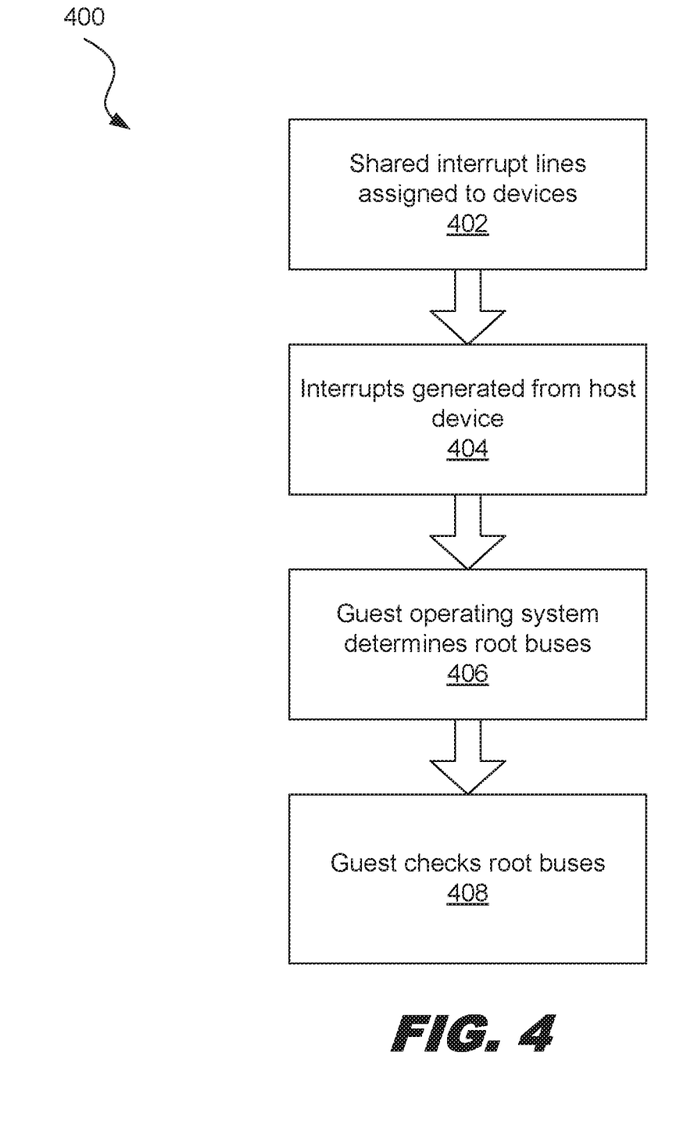
FIG. 4 is a flowchart showing an illustrative routing of interrupts from host devices to virtual root buses, in accordance with various examples of the present disclosure.

FIG. 4 is a flowchart showing an illustrative routing of interrupts from host devices to virtual root buses. The method 400 may be performed by processing logic that may comprise hardware (e.g., circuitry, dedicated logic, programmable logic and microcode), software (such as instructions run on a computer system, specialized hardware, dedicated machine, or processing device), firmware, or a combination thereof.

At block 402, shared interrupt lines are assigned for use by devices coupled to a host's root bus (i.e., the primary bus). In the present example, the number of interrupt lines available for each primary bus is four. These interrupt lines are shared by devices that are behind primary buses as well as devices that are behind expanders that are coupled to the buses.

At block 404, a first device event is sent from a host device behind the host's root bus 0. The event triggers an interrupt that is received by the processor of the virtual machine. The guest operating system running on the virtual machine receives the interrupt via a main bus of the virtual machine.

At block 406, the guest operating system determines which virtual root buses to check when an interrupt is received. The ACPI tables exposed to the guest operating system identify the virtual buses of the virtual machine. Accordingly, the guest operating system checks the ACPI tables or a data structure derived from the ACPI tables, such as an image to determine the virtual buses.

In the present example, the ACPI tables of the virtual machine include a virtual root bus 0 and a virtual root bus 1. Virtual root bus 1 corresponds to devices behind an expander coupled to root bus 0. The ACPI tables expose the virtual root bus 0 device I/O and memory addresses as well as the virtual root bus 1 device I/O and memory addresses. Accordingly, when the guest operating system receives the interrupt on the main bus, the guest operating system determines that the interrupt may have been sent from a device on either virtual root bus 0 or virtual root bus 1.

At block 408, the guest operating system checks the devices behind virtual root bus 0 and virtual root bus 1 for incoming data.

Figure 5:
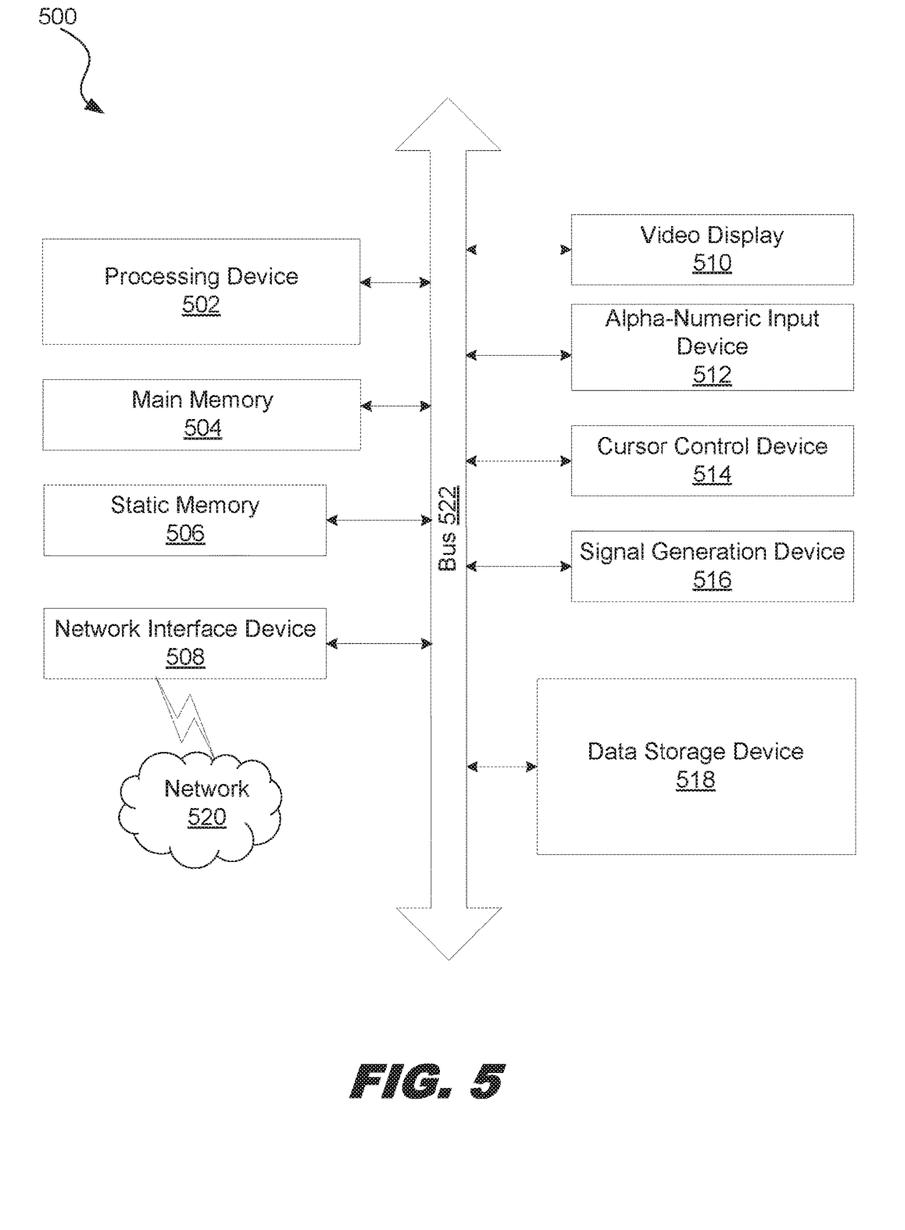
FIG. 5 is a block diagram illustrating a computer system that may perform one or more of the operations described herein, in accordance with various examples of the present disclosure.

FIG. 5 illustrates a diagram of a machine in the exemplary form of a computer system 500 within which a set of instructions, for causing the machine to perform any one or more of the methodologies discussed herein, may be executed. The machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

In the present example, computer system 500 includes processing device (processor) 502, main memory 504 (e.g., read-only memory (ROM), flash memory, dynamic random access memory (DRAM) such as synchronous DRAM (SDRAM), double data rate (DDR SDRAM), or DRAM (RDRAM), and so forth), static memory 506 (e.g., flash memory, static random access memory (SRAM), and so forth), and data storage device 518, which communicate with each other via bus 522.

Processor 502 represents one or more general-purpose processing devices such as a microprocessor, central processing unit, or the like.

More particularly, processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 executes instructions for performing the operations and steps discussed herein.

Computer system 500 may further include network interface device 508.

Computer system 500 also may include video display unit 510 (e.g., a liquid crystal display (LCD) or a cathode ray tube (CRT)), alphanumeric input device 512 (e.g., a keyboard), cursor control device 514 (e.g., a mouse), and signal generation device 516 (e.g., a speaker).

Data storage device 518 may include a computer-readable storage medium that stores one or more sets of instructions (e.g., software) embodying any one or more of the methodologies or functions described herein. The instructions may also reside, completely or at least partially, within main memory 504 and/or within processor 502 during execution thereof by computer system 500, main memory 504 and processor 502 also constituting computer-readable storage media. The instructions may further be transmitted or received over network 520 via network interface device 508.

While data storage device 518 is shown in an example to be a single medium, the term "data storage device" should be taken to include a single medium or multiple media (e.g., a centralized or distributed database, and/or associated caches and servers) that store the one or more sets of instructions.

The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Figure 6:
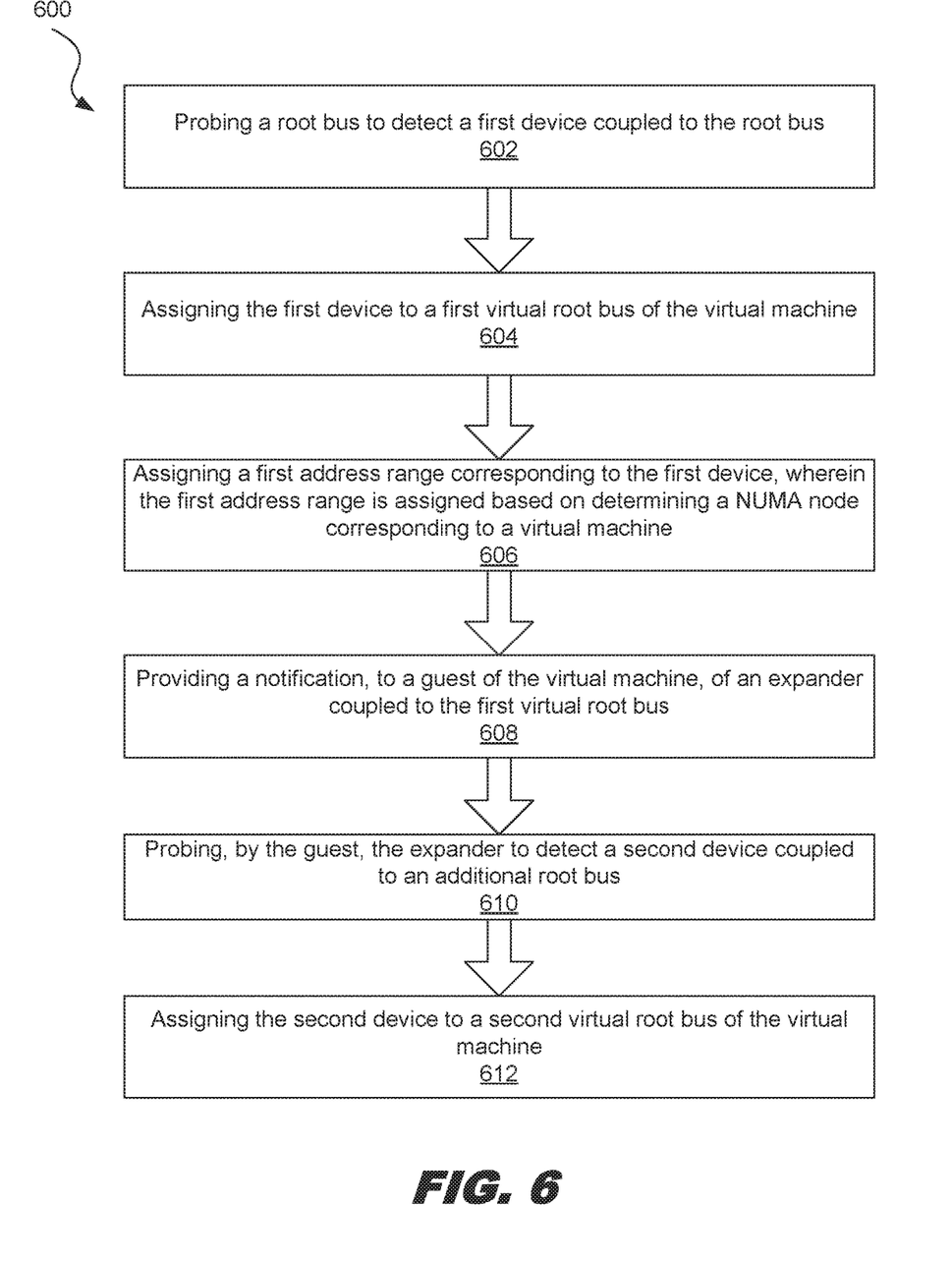
FIG. 6 is a flowchart showing an illustrative configuration of devices in a virtual environment, in accordance with various examples of the present disclosure.

FIG. 6 is a flowchart showing an illustrative configuration of devices in a virtual environment. The method 600 may be performed by processing logic that may comprise hardware (e.g., circuitry, dedicated logic, programmable logic and microcode), software (such as instructions run on a computer system, specialized hardware, dedicated machine, or processing device), firmware, or a combination thereof.

At block 602, a guest of a virtual machine probes a root bus to detect a first device coupled to the root bus. In some examples, the guest includes a BIOS or other firmware of a virtual machine that probes the root bus by accessing a configuration address space of the virtual machine to identify devices.

At block 604, the guest assigns the first device to a first virtual root bus of the virtual machine.

At block 606, a guest of a virtual machine assigns a first address range corresponding to the first device. The first address range is assigned based on the guest determining a NUMA node of the virtual machine. In some examples, the guest includes an operating system that reads a configuration space to determine the NUMA node corresponding to the virtual machine. Accordingly, the guest is able to assign an address range corresponding to the NUMA node to first device.

At block 608, the hypervisor provides a notification to a guest of the virtual machine that there is an expander coupled to the first virtual root bus. In some examples, the notification includes an indication in the configuration space of the virtual machine that informs the guest of the presence of the expander.

At block 610, a guest of the virtual machine probes the expander to detect a second device coupled to an additional root bus.

At block 612, the guest assigns the second device to a second virtual root bus.

Figure 7:
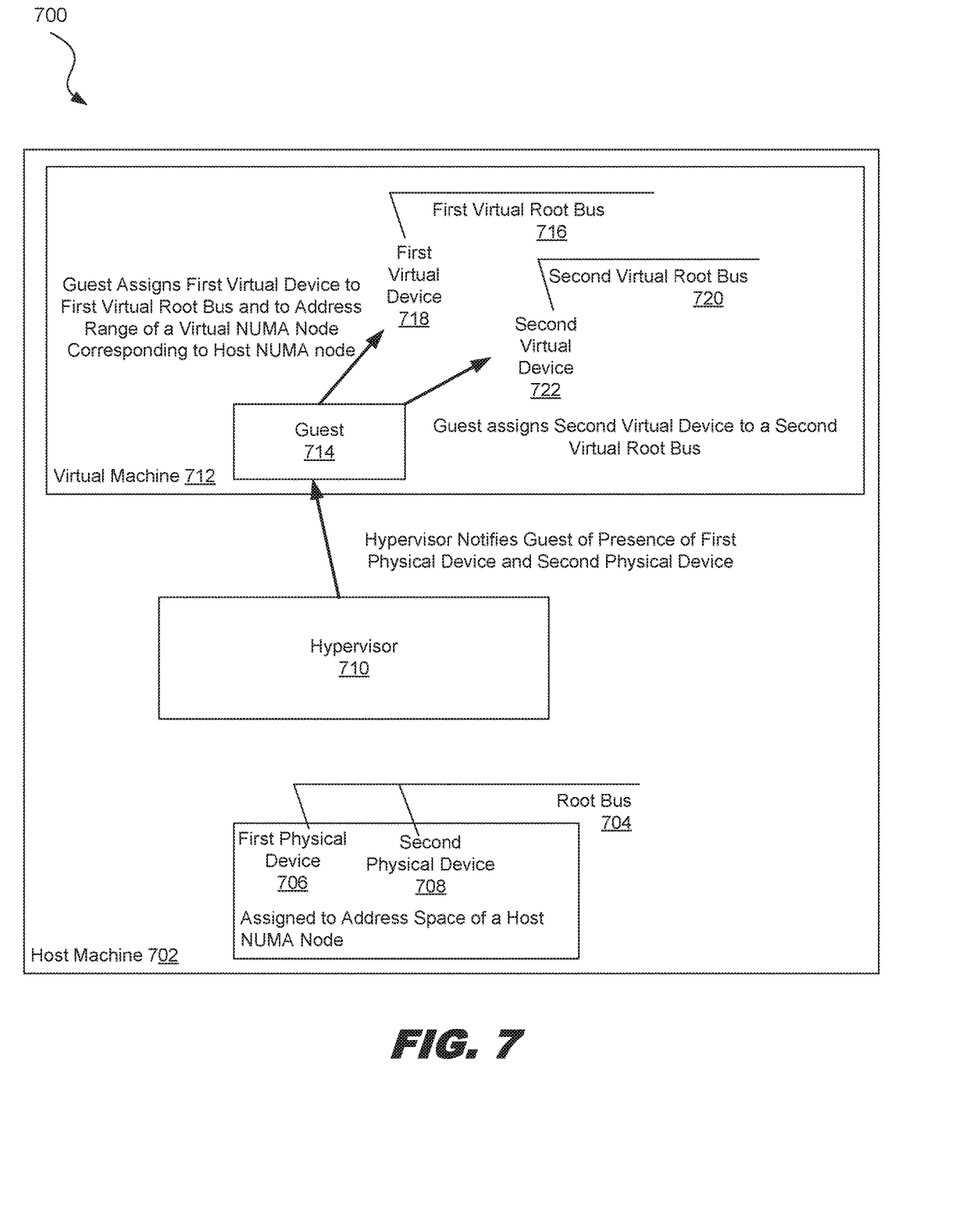
FIG. 7 is a block diagram illustrating a computer system that may perform one or more of the operations described herein, in accordance with various examples of the present disclosure.

FIG. 7 illustrates a diagram of a machine in the exemplary form of a computer system 700 within which a set of instructions, for causing the machine to perform any one or more of the methodologies discussed herein, may be executed.

The system 700 includes a host machine 702 that provides a first physical device 706 and a second physical device 708 that are communicatively coupled to a root bus 704. The host machine 702 assigns the first physical device 706 and the second physical device 708 to a NUMA node.

A hypervisor 710 notifies a guest 714 of a virtual machine 712 of the presence of the first physical device 706 and the second physical device 708. In some examples, the hypervisor 710 notifies the guest 714 by preparing a configuration space corresponding to the virtual machine 712 that the guest 714 reads during a boot process to identify the devices.

The guest 714 assigns a first virtual device 718 (that corresponds to the first physical device 706) to a first virtual root bus 716 and to an address range of a virtual NUMA node that corresponds to a same NUMA node to which the first physical device 706 is assigned.

The guest 714 further assigns a second virtual device 722 (that corresponds to the second physical device 708) to a second virtual root bus 720.

Figure 8:
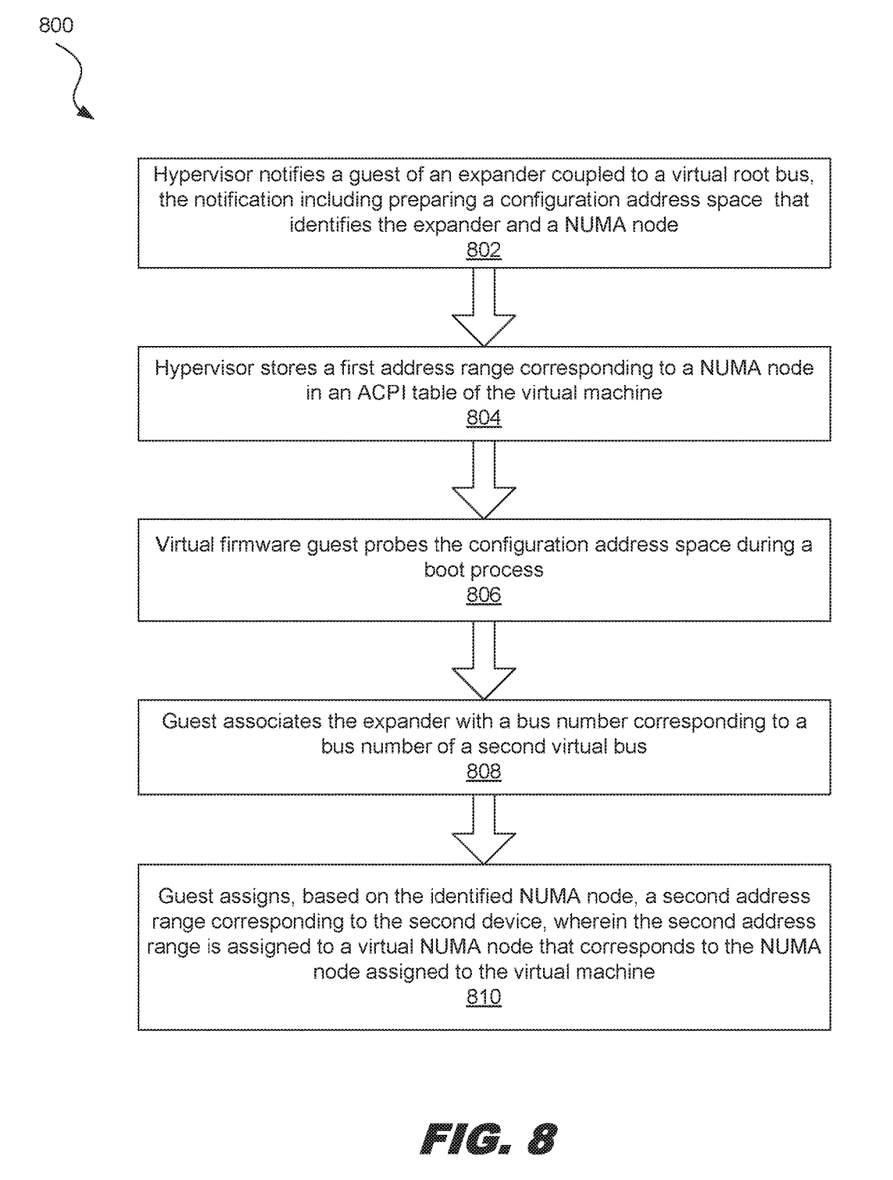
FIG. 8 is a flowchart showing an illustrative configuration of devices in a virtual environment, in accordance with various examples of the present disclosure.

FIG. 8 is a flowchart showing an illustrative configuration of devices in a virtual environment. The method 800 may be performed by processing logic that may comprise hardware (e.g., circuitry, dedicated logic, programmable logic and microcode), software (such as instructions run on a computer system, specialized hardware, dedicated machine, or processing device), firmware, or a combination thereof.

At block 802, a hypervisor notifies a guest of an expander that is coupled to a virtual root bus. In the present example, the hypervisor notifies the guest by preparing a configuration address space of a virtual machine that identifies the expander and NUMA nodes corresponding to devices.

At block 804, the hypervisor stores a first address range corresponding to a NUMA node in an ACPI table of the configuration address space. A guest of the virtual machine associates the first address range with devices corresponding to the NUMA node such that I/O corresponding to the devices is performed using the first address range that corresponds to the NUMA node.

At block 806, a virtual firmware guest of the virtual machine probes the configuration address space during a boot process to configure devices that have been assigned to the virtual machine.

At block 808, the guest associates the expander that is identified in the configuration address space with a bus number corresponding to a second virtual bus. The bus number of the second virtual bus is a different number than the bus number assigned to the virtual root bus to which the expander is coupled.

At block 810, the guest assigns, based on the identified NUMA nodes in the configuration address space, a second address range corresponding to a second device. The guest assigns the second address range to a virtual NUMA node. In the present example, the virtual node corresponds to a NUMA node of the host machine that has been assigned to the virtual machine.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

it should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining," "providing," "generating," "performing," and the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain examples of the present disclosure also relate to an apparatus for performing the operations herein. This apparatus may be constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Although illustrative examples have been shown and described, a wide range of modification, change and substitution is contemplated in the foregoing disclosure and in some instances, some features of the examples may be employed without a corresponding use of other features. One of ordinary skill in the art would recognize many variations, alternatives, and modifications. Thus, the scope of the invention should be limited only by the following claims, and it is appropriate that the claims be construed broadly and in a mariner consistent with the scope of the examples disclosed herein.

What is claimed is:

1. A method for configuring devices in a virtual environment comprising:
    probing a root bus to detect a first device coupled to the root bus;
    assigning the first device to a first virtual root bus of a virtual machine;
    assigning a first address range corresponding to the first device, wherein the first address range is assigned based on determining a NUMA node corresponding to the virtual machine;
    providing a notification, to a guest of the virtual machine, of an expander coupled to the first virtual root bus;
    probing, by the guest, the expander to detect a second device coupled to an additional root bus; and
    assigning the second device to a second virtual root bus of the virtual machine.

2. The method of claim 1, wherein the notification is provided by a hypervisor.

3. The method of claim 1, further comprising:
    providing a configuration address space corresponding to the virtual machine, wherein the configuration address space identifies the expander and the NUMA node.

4. The method of claim 1, wherein the probing by the guest is performed during a boot process.

5. The method of claim 1, further comprising:
    storing the first address range in an ACPI table of the virtual machine.

6. The method of claim 1, wherein the expander is associated with a bus number corresponding to a bus number of the second virtual root bus.

7. The method of claim 1, wherein the guest includes a virtual firmware of the virtual machine.

8. The method of claim 1, further comprising:
    assigning, based on the determined NUMA node, a second address range corresponding to the second device.

9. The method of claim 8, wherein the second address range is assigned to a virtual NUMA node that corresponds to the determined NUMA node.

10. A non-transitory computer-readable medium comprising computer-readable instructions which, when executed by a processor, cause the processor to perform operations comprising:
    probing a root bus to detect a first device coupled to the root bus;
    assigning the first device to a first virtual root bus of a virtual machine;
    assigning a first address range corresponding to the first device, wherein the first address range is assigned based on determining a NUMA node corresponding to the virtual machine;
    providing a notification, to a guest of the virtual machine, of an expander coupled to the first virtual root bus;
    probing, by the guest, the expander to detect a second device coupled to an additional root bus; and
    assigning the second device to a second virtual root bus of the virtual machine.

11. The non-transitory computer-readable medium of claim 10, the operations further comprising:
    providing a configuration address space corresponding to the virtual machine, wherein the configuration address space identifies the expander and the NUMA node.

12. The non-transitory computer-readable medium of claim 10, wherein the guest includes a virtual firmware of the virtual machine.

13. The non-transitory computer-readable medium of claim 10, the operations further comprising:
    assigning, based on the determined NUMA node, a second address range corresponding to the second device.

14. The non-transitory computer-readable of claim 13, wherein the second address range is assigned to a virtual NUMA node that corresponds to the determined NUMA node.

15. A system for configuring devices in a virtual environment, comprising:
    a host machine including a root bus that is communicatively coupled to a first physical device and a second physical device, wherein the first physical device and the second physical device are assigned to an address space of a host NUMA node;
    a hypervisor running on the host machine, the hypervisor to notify a guest of a virtual machine of a presence of the first physical device and the second physical device;
    the guest to assign a first virtual device to a first virtual root bus, the first virtual device corresponding to the first physical device, wherein the first virtual device is assigned a first address range of a virtual NUMA node that corresponds to the host NUMA node; and the guest further to assign a second virtual device to a second virtual root bus, the second virtual device corresponding to the second physical device.

16. The system of claim 15, the hypervisor further to provide a configuration address space corresponding to the virtual machine, wherein the configuration address space identifies the virtual NUMA node.

17. The system of claim 15, wherein the guest includes a virtual firmware.

18. The system of claim 15, the guest further to assign the second virtual device to a second address range of the virtual NUMA node.

19. The system of claim 15, the hypervisor further to provide a notification, to the guest, of an expander coupled to the root bus.

20. The system of claim 19, the guest further to probe the expander to detect the second virtual device.

* * * * *